United States Patent
Kowles (10) Patent No.: US 9,542,306 B2
(45) Date of Patent: Jan. 10, 2017

(54) DYNAMIC STORAGE DEVICE PROVISIONING

(71) Applicant: Seagate Technology LLC, Cupertino, CA (US)

(72) Inventor: Andrew Michael Kowles, Boulder, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 261 days.

(21) Appl. No.: 13/801,490

(22) Filed: Mar. 13, 2013

(65) Prior Publication Data

US 2014/0281229 A1    Sep. 18, 2014

(51) Int. Cl.
*G06F 3/06* (2006.01)
*G06F 12/02* (2006.01)

(52) U.S. Cl.
CPC ........... *G06F 12/0223* (2013.01); *G06F 3/061* (2013.01); *G06F 3/0616* (2013.01); *G06F 3/0665* (2013.01); *G06F 3/0673* (2013.01)

(58) Field of Classification Search
CPC ...... G06F 3/061; G06F 3/0616; G06F 3/0665; G06F 3/0673; G06F 12/0223
See application file for complete search history.

(56) References Cited

U.S. PATENT DOCUMENTS

| | | | |
|---|---|---|---|
| 8,131,927 B2 | 3/2012 | Kawaguchi | |
| 8,166,232 B2 | 4/2012 | Kawaguchi | |
| 8,285,963 B2 | 10/2012 | Asaki et al. | |
| 8,407,409 B2 | 3/2013 | Kawaguchi | |
| 8,407,436 B2 | 3/2013 | Arakawa | |
| 8,521,978 B2 | 8/2013 | Kasako | |
| 8,533,419 B2 | 9/2013 | Asaki et al. | |
| 2009/0172286 A1* | 7/2009 | Lasser et al. | 711/127 |
| 2012/0054421 A1* | 3/2012 | Hiratsuka et al. | 711/103 |
| 2012/0117309 A1 | 5/2012 | Schuette | |
| 2012/0297140 A1* | 11/2012 | Wu et al. | 711/133 |
| 2012/0303873 A1 | 11/2012 | Nguyen et al. | |
| 2013/0194696 A1* | 8/2013 | Kitahara | G11B 5/012 360/75 |
| 2014/0089629 A1* | 3/2014 | Griffin et al. | 711/173 |

FOREIGN PATENT DOCUMENTS

| JP | 2014-519112 A | 8/2014 |
|---|---|---|
| WO | 2012-148828 A2 | 11/2012 |

OTHER PUBLICATIONS

Extended European Search Report issued in European Application No. 14159591.8, mailed Jul. 31, 2014, 7 pages.

* cited by examiner

*Primary Examiner* — Edward Dudek, Jr.
(74) *Attorney, Agent, or Firm* — Holzer Patel Drennan

(57) ABSTRACT

A method or system for allocating the storage space of a storage medium into a permanently allocated media cache storage region; a dynamically mapped media cache storage region, and statically mapped storage region, wherein the dynamically mapped media cache storage region is used for performance and/or reliability enhancing functions.

18 Claims, 6 Drawing Sheets

DYNAMIC STORAGE DEVICE PROVISIONING

BACKGROUND

As the requirements for data storage, retrieval, and analysis has increased, the need for cheaper and faster data storage devices has also increased. Data storage devices, such as disc drives, solid state drives, etc., store data on a different recording media using different storage technologies such as magnetic recording, optical recording, etc. Disc drives are widely used as data storage device in computing systems. To meet the increasing needs, disc drives providers have increased the capacity of the disc drives as well as the density of recording on the disc drives. At the same time, given the vast amount of data being stored and processed by users, storage device providers are under pressure to provide storage capacity at cheaper cost.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations and implementations as further illustrated in the accompanying drawings and defined in the appended claims.

A method or system for allocating the storage space of a storage medium into a permanently allocated "media cache" storage region; a dynamically mapped media cache storage region; and statically mapped storage region, wherein the dynamically mapped media cache storage region is used for performance-enhancing functions.

These and various other features and advantages will be apparent from a reading of the following detailed description.

BRIEF DESCRIPTIONS OF THE DRAWINGS

The described technology is best understood from the following Detailed Description describing various implementations read in connection with the accompanying drawings.

DETAILED DESCRIPTIONS

In the following description, for the purposes of explanation, numerous specific details are set forth in order to provide a thorough understanding of the various implementations described herein. While various features are ascribed to particular implementations, it should be appreciated that the features described with respect to one implementation may be incorporated with other implementations as well. By the same token, however, no single feature or features of any described implementation should be considered essential, as other implementations may omit such features.

As the requirements for data storage, retrieval, and analysis has increased, the need for cheaper and faster data storage devices has also increased. Disc drives are widely used as data storage device computing systems. Such data storage devices include disc drives that store data on magnetic media, optical media, etc. To meet the increasing needs, data storage providers have increased the size of the storage devices as well as the density of the storage devices. Substantially every byte of storage capacity that the storage providers provide to their clients has a cost attached thereto. For example, such cost may be specified in terms of dollars per terabytes, etc. Generally, for disc drive providers and other storage capacity providers, it costs more to produce more storage capacity. However, given the competitive nature of the storage industry, the price that the storage providers can extract from their clients is limited by market forces. Therefore, the storage providers have incentive to reduce the cost of storage as sold to their clients to increase their profit margin and/or to stay competitive.

One of the factors that increases the storage providers' cost per storage capacity or reduces the revenues per storage capacity sold to clients is the overprovisioning of storage capacity where storage providers provide more physical storage capacity than what is sold or reported to their clients. An example of this can be seen when purchasing two different devices from two different manufacturers, both marketed with the same capacity: It can be observed that the devices report slightly different capacities. Overprovisioning, in this context, involves producing and shipping more actual storage capacity than the storage capacity that is sold or marketed to the client or marketplace. Thus, for example, if a storage capacity of 1 TB is sold to a client, the storage provider actually produces ten percent more capacity, thus 1.1 TB of storage capacity is provided to the client. In such a case, while the storage provider is able to get revenue for substantially only 1 TB, it incurs the costs for producing and providing 1.1 TB of storage capacity.

There are a number of reasons for service providers to use overprovisioning. For example, for storage in the form or NAND drives, the overprovisioning ensures that even after the eventual wearing of the storage medium (NAND Flash wears out), the client still has some minimum storage that was sold to the client. For storage in the form of disc drives, the general term 'overprovisioning' is used for many reasons. The overprovisioning discussed here is used to boost performance metrics, such as average access time, etc., of the disc drives. Disc drive storage providers have incentive to increase the size of the overprovisioning to further increase the performance of the disc drives. However, anytime the amount of overprovisioning is increased, the cost per unit storage capacity also increases. Thus, for a disc drive that is sold as having a 1 TB of storage capacity, if the overprovisioning is increased from 10% to 20%, the cost per TB of storage capacity also increases by 20%, whereas the provider may not be able to recover such cost from the client. Thus, there is a tradeoff in providing increases overprovisioning between the cost of overprovisioning and the performance benefits obtained by the overprovisioning.

An implementation provided herein dynamically maps at least part of the storage space used for overprovisioning. For example, for a disc drive having a total storage capacity of 1.1 TB (1100 GB) where 0.1 TB (100 GB) is used for overprovisioning, at least a part of the 0.1 TB overprovisioned storage space is dynamically mapped. For example, for the disc drive having 1.1 TB of total capacity, instead of providing 0.1 TB of storage regions for overprovisioning, substantially only 0.01 TB (10 GB) of storage area is provided for overprovisioning. Another 0.09 TB (90 GB) of the storage capacity is dynamically mapped and it is used for performance-enhancing functions. In such an implementation, an infrequently or lightly used region of the storage device is dynamically mapped. For example, given 0.01 TB of unmapped area for overprovisioning and 1.09 TB of mapped storage regions, 0.09 TB of mapped storage region is dynamically mapped and such dynamically mapped storage region is used for performance boosting functionalities generally performed using the overprovisioned storage regions.

Figure 1:
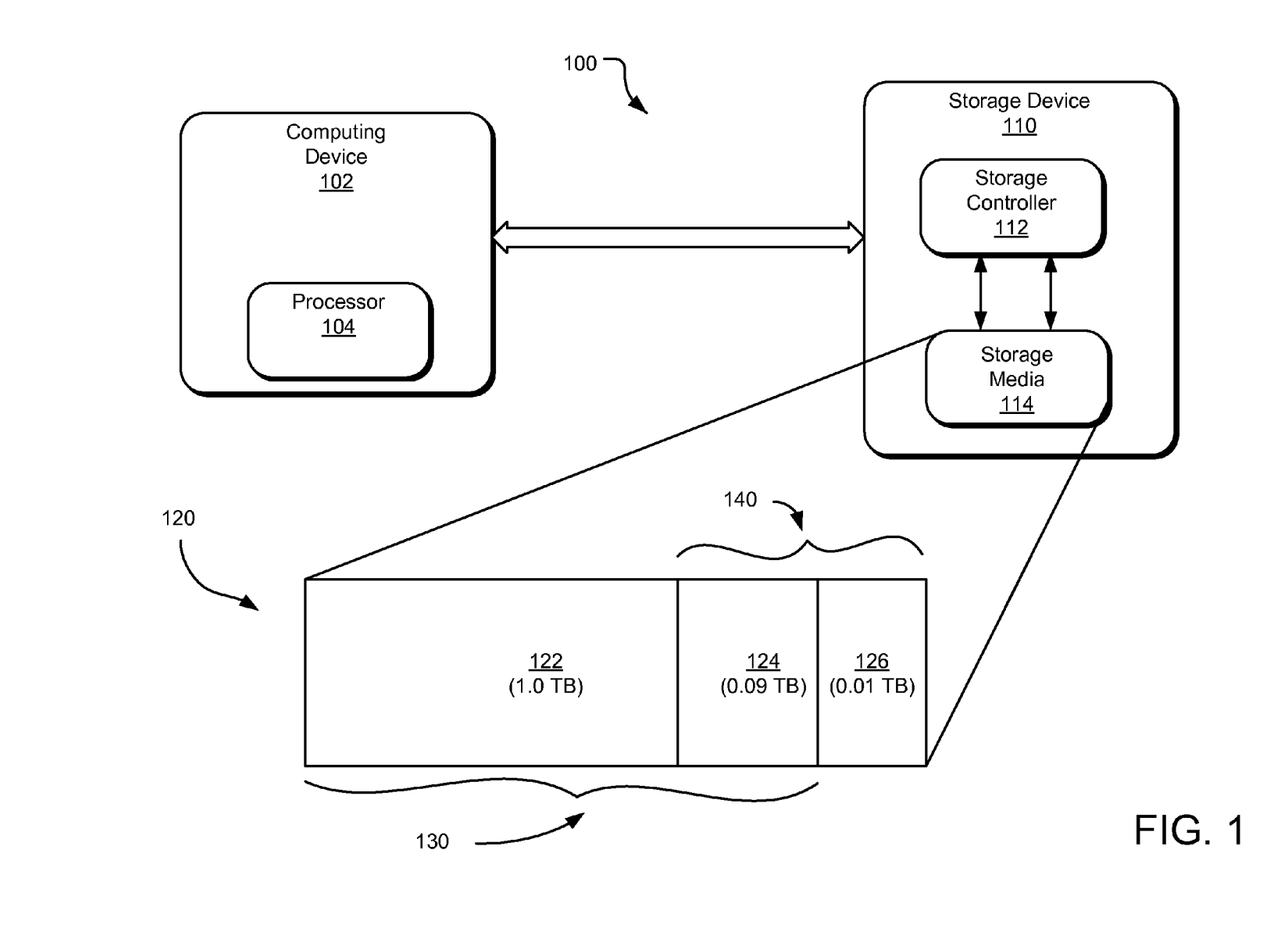
FIG. 1 illustrates a block diagram of an implementation of a system for dynamic overprovisioning of media.

FIG. 1 discloses a system 100 for dynamic overprovisioning of the storage media. Specifically, the system 100 includes a computing device 102 having a processor 104 that is communicatively connected to a storage device 110. While the system 100 is illustrated to have the storage device 110 external to the computing device 102, in an alternative implementation, the storage device 110 may be internal to the computing device 102. The storage device 110 may be, for example, a magnetic disc drive, an optical disc drive, a flash drive, etc. The storage device 110 includes a storage controller 112 and storage media 114. The storage controller 112 is configured to receive storage commands from the computing device 102 and process the storage commands to read data from the storage media 114, write data to the storage media 114, control movement of a read/write head (if necessary), etc.

In one implementation, the storage media 114 is divided into a number of storage regions. For example, where the storage device 110 is a magnetic disc drive, the storage media 114 is divided into a number of regions, each region made of one or more sectors on the disc drives. The system 100 illustrates the entire storage capacity of the storage media 114 by a storage region 120. As illustrated in the system 100, the storage region 120 includes a number of different storage regions 122, 124, 126, etc. In one implementation, the storage controller 112 maintains the division of the storage media 114 into various storage regions by keeping an internal mapping of the tracks and sectors on the storage media 114 to the various storage regions designated in the storage region 120. For example, for a disc drive storage device, certain sectors on the discs may be allocated to the storage region 122, whereas other sectors of the discs may be allocated to the storage region 126.

In one implementation, the storage controller 112 also generates and stores the mapping of the storage regions 122, 124, 126 to logical block addresses (LBAs). Specifically, the usable storage regions of the storage media 114 are mapped to the LBAs. In such an implementation, the storage region 120 is also divided into a number of blocks and each block is given a logical block address (LBA). For example, each of the storage regions 122-126 may include a plurality of blocks with each of such blocks being mapped to LBAs.

Furthermore, the storage controller 112 may also make the mapping of the LBAs to the storage regions available to the processor 104 or to other devices that require access to the storage media 114. Yet alternatively, the storage controller 112 may also communicate the storage capacity of the storage media 114 to such external devices. As data is written to the storage media 114, the storage controller keeps track of which storage regions are already used and which storage regions are still available for additional storage. In response to a request for writing additional data to the storage media 114, the storage controller 112 determines the availability for storage on one or more of the storage regions 122, 124, 126, and determines the destination storage region for storing such additional data. For example, if the storage controller 112 determines that the storage region 126 is already used for storing data, new requests for storage of additional data is directed to the storage region 122, 124, etc.

In one implementation, the storage regions 122, 124, 126, etc., are designated as statically mapped or dynamically mapped storage regions. In such an implementation, the mapping of the LBAs to the storage regions depends on whether the given region is statically allocated or dynamically allocated. In a storage region that is statically allocated, once a given physical storage address is mapped to an LBA, such mapping does not change in the future. On the other hand, in a dynamically mapped region, the storage controller 112 may dynamically change the mapping of the LBA to the physical address.

The division of the storage region 120 into statically and dynamically allocated regions allows the storage controller 112 to dynamically change the overprovisioning of the storage media 114. For example, given that the total storage capacity of the storage region 120 is 1.1 TB, the storage controller 112 may report 1.09 TB as the usable storage capacity, while still providing a minimum 0.1 TB of performance boosting media cache for the entire life of the storage device 110. The storage controller 112 achieves such overprovisioning by dynamically mapping at least part of the storage region 120. In the example illustrated in FIG. 1, where the total storage capacity of the storage region 120 is 1.1 TB, the storage region 122 with 1.0 TB is designated as statically mapped. The storage region 124 with 0.09 TB capacity and the storage region 126 with 0.01 TB capacity are dynamically mapped. Furthermore, the storage controller 112 reports the combined capacity of the storage regions 122 and 124 (referred to by 130 in FIG. 1) as the total available capacity for the storage device 110. In such a case, the combined storage area of the regions 124 and 126 (referred to by 140 in FIG. 1) is used as media cache for various performance-enhancing purposes, such as temporary copying of data, error checking, sorting of data, etc. Other uses of media cache include boosting random write performance in certain host workloads, which are increasingly difficult to manage. Alternatively, the media cache may also be used to boost reliability by storing additional parity (error correction information) for the host data, which is being stored. Yet alternatively, the media cache may also be used to meet warranty requirements by minimize the effects of so-called "work amplification" where a particular host workload is especially bad for drive reliability. As a result, the dynamically mapped storage region 124 is both reported as usable and at the same time used as media cache for performance-enhancing, and other functions.

In such an implementation, while the dynamically mapped storage region 124 is used for one or more performance or reliability enhancing functions, the storage capacity of the storage region 124 is also reported to the host as usable space. In other words, the storage region 124 is used both for storing data as well as for performance-enhancing functions. In yet another implementation, the dynamically mapped storage region 124, which is used for performance-enhancing functions, is mapped to the storage areas of the storage media that are infrequently used or least used. In such an implementation, sections of the LBA space that is more likely to be used are mapped to the statically mapped storage region 122. Mapping the less frequently accessed sections of the host-addressable LBA space to the dynamically mapped storage region 124 ensures that the dynamically mapped storage region 124 is available for performance-enhancing functions for most of the life of the storage device 110.

In an implementation, the amount of dynamic overprovisioning may be based on the type of client using the storage device 110, the market in which the storage device 110 is used, etc. For example, if the storage device 110 is to be used by a consumer for personal use at home, it is likely that there are large sections of the LBA space that are very unlikely to be used or used very infrequently. In such a case, a larger portion of the storage region 120 is dynamically mapped as being part of the dynamically mapped storage region 124 and very small portion is designated as overprovisioned storage region 126. In other words, in such a target use of the storage device, the percentage of the total storage space 120 that is reported to the client is quite high. On the other hand, if the storage device 110 is to be used in an industry where most of the LBA space is likely to be used very frequently, the designated overprovisioned storage region 126 has to be larger to maintain performance levels. As a result, in such a case, the percentage of the total storage space 120 that is reported to the client is lower than in the case of the storage device 110 being used by a consumer.

Figure 2:
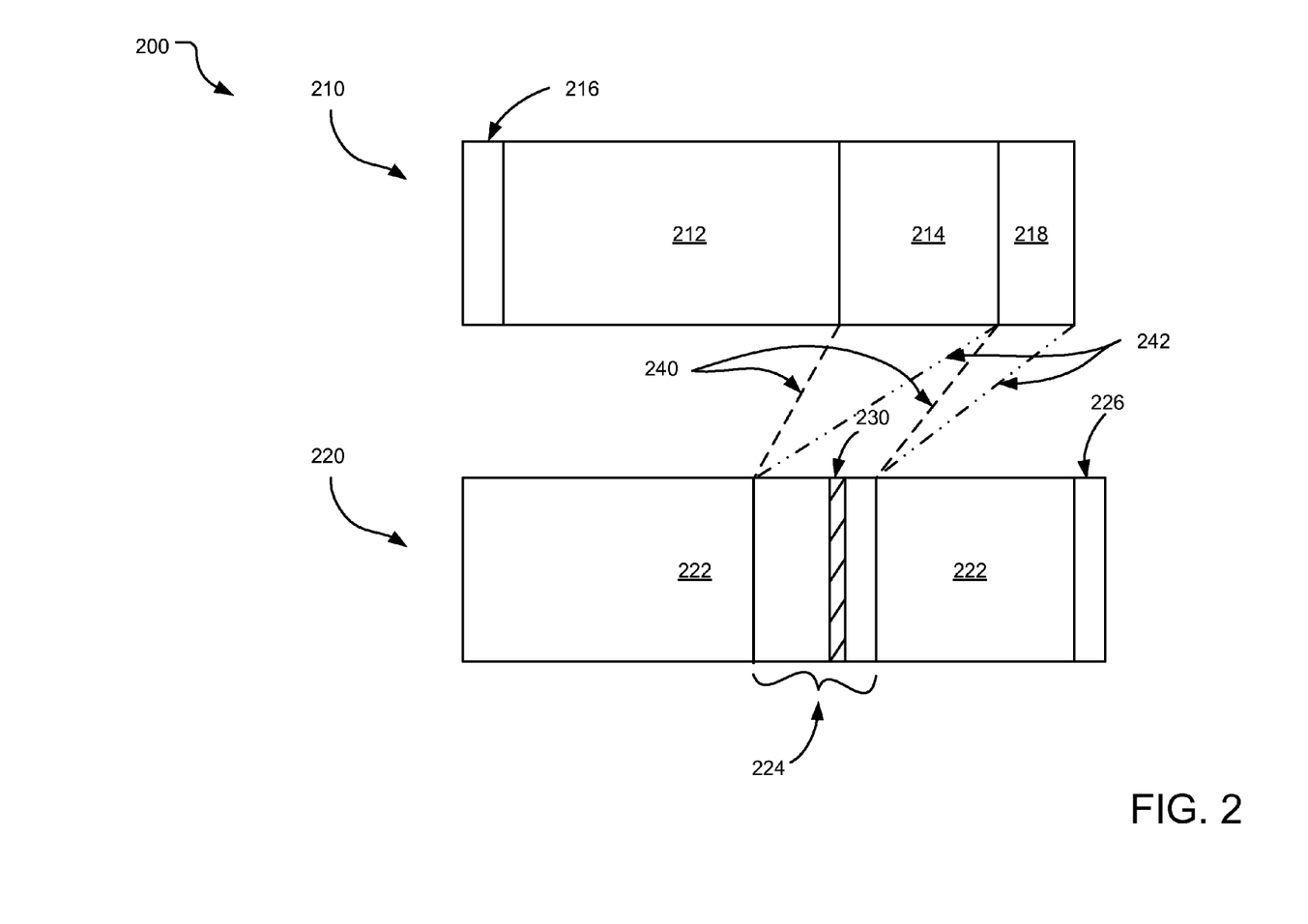
FIG. 2 illustrates a block diagram of an alternate implementation of a system for dynamic overprovisioning of media.

FIG. 2 illustrates the mapping 200 of the full capacity of a storage device. Specifically, FIG. 2 illustrates the mapping between an LBA map 210 and the actual physical capacity 220 of the storage device. In the illustrated implementation, a storage controller determines the usage patterns of the various regions of the LBA map 210. Thus, for example, in FIG. 2, the region 212 is determined to have average use, the region 214 is determined to be very lightly used, whereas the regions 216 and 218 are determined to have frequent or above average use. In one implementation, initial usage patterns for various regions are determined based on historical usage patterns based on monitoring of the workloads of the existing products. In an alternative implementation, the usage patterns, and hence the mapping of certain LBAs to the dynamic region, are determined dynamically over the life of the storage device, though the initial state of the mapping could be based on the historical usage data as mentioned.

The storage capacity of the storage device as reported by the LBA map 210 is slightly lower than the physical capacity 220 of the storage media. For example, if the physical capacity 220 is 1.10 TB, the reported storage capacity as per the LBA map 210 is set to 1.09 TB. The difference of 0.01 TB of physical storage capacity is used as the minimum media cache size for various functions, including performance enhancement and system resource management. FIG. 2 illustrates such minimum media cache 226 of 0.01 TB. The storage space of the media cache 226 is dynamically mapped and it is not reported as available storage capacity. Furthermore, the remainder of the storage capacity 220 is divided into statically mapped regions 222 and dynamically mapped region 224. The storage controller maps the lightly used region 214 of the LBA map 210 to the dynamically mapped region 224, as illustrated by 240. For example, the size of the dynamically mapped region 224 may be 0.09 TB, the size of the storage region 226 designated as media cache equal to 0.01 TB, and the size of the statically mapped regions 222 equal to 1.0 TB. In such a case, when the storage device is first placed into use (no user data having been written to the device), the combined capacity of the storage regions 222 and 224, equaling 1.09 TB, can be reported as capacity to the host/user. At the same time the combined capacity of the storage regions 224 and 226, equaling 0.1 TB, can be used as media cache for performance-enhancing and/or reliability-enhancing functions.

In various operating systems used by hosts, the host may utilize the "host trim command," or equivalent, which means that the host may write to certain LBAs and then "trim" them such that the host device need no longer consider those LBAs as "valid" or "written." For example, in FIG. 2, an operating system may initially write data to LBA space 218 on a frequent basis. In this case, the LBA space 218 is not mapped to the dynamically mapped region 224. As the LBA space 210 is used over the life of the device, the lightly used region 214 may be used more and more such that less and less of the dynamically used region is available for various media cache or performance enhancing functions. In such a scenario, if the host issues a trim command to free some of the LBA space 218 that was deemed to be frequently used, the controller may dynamically change the mapping of the LBA space 210 to the physical storage capacity 220 such that now the newly freed LBA space 218 is mapped (as illustrated by 242) to the dynamically mapped storage region 224 instead of the previous mapping 240 of the LBA space 214 to the dynamically mapped storage region 224. Such dynamic changing of the mapping of the various sections of the LBA space 210 to the physical storage capacity 220 may be performed in response to other changes in the usage patterns of the LBA space 210 as well.

In an alternative implementation, such dynamic mapping of various sections of the LBA space 210 to the physical storage capacity 220 may not be based on freeing of one or more sections of the LBA space 210 by a host. Instead, the system may monitor the usage of the LBA space 210 and determine such remapping based on the changes in the pattern of usage for such sections. Thus, for example, if the controller determines that a first LBA space that is mapped to the dynamically mapped storage region 224 has a change in its usage pattern, the controller may dynamically remaps the first LBA space to some other section of the physical storage capacity 220 and then maps a second LBA space from the LBA space 210 to the dynamically mapped storage region 224. In this manner, the LBAs that are mapped to the dynamically mapped storage region 224 are themselves mapped dynamically. This allows the system to accommodate for situations where an LBA space expected to be lightly used and therefore mapped to the dynamically mapped storage region 224 is, unexpectedly, heavily used. As a result of such dynamic allocation, the performance enhancement and other advantages of providing the dynamically mapped storage region 224 are maintained in such unexpected circumstances. Furthermore, the dynamic unmapping of certain sections of the LBA space 210 from the dynamically mapped region 224 and subsequent mapping of some other sections of the LBA space 210 to the dynamically mapped region 224 may continue over the life of the usage of the storage device. Such continuous unmapping and remapping provides for continued use of the dynamically mapped region 224 for various performance enhancing functions, reliability enhancing functions, etc.

When a user starts to use the storage media, unless and until the entire statically mapped storage capacity of 1.0 TB is considered valid by the user/host, both of the dynamically mapped regions 224 and 226 together are used for various performance-enhancing functions. Thus, as long as the entire statically mapped capacity of 1.0 TB is not considered valid, 0.1 TB of storage capacity is available for performance-enhancing functions in spite of providing substantially only 0.01 TB of space as permanent media cache 226. Thus, the user or the host device does not see any degradation is the level of performance even with a small size of the permanently allocated media cache 226. Given that most of the time, users (especially users in the consumer market) do not end up using the entire capacity of their storage devices, the performance of the storage devices does not suffer over most of the life of the storage device.

When a user writes data to the storage device in an ad-hoc manner, the dynamically mapped regions of 224 as well as the media cache 226 can be used to temporarily store data, process the data, sort the data, etc., before the data is moved from these regions to its terminal destination. Such terminal destination may be in the statically mapped regions 222. As a result, given that the size of the total dynamically mapped capacity is much larger than the size of the media cache 226, the performance of the storage device as perceived by the user is not degraded. At the same time, the storage device manufacturer is able to report a larger usable capacity to the user, thus reducing the effective cost of providing storage.

As the user, such as a host device, starts using and keeping valid more and more of the storage capacity, it is likely that even when an infrequently used sections 214 of the LBA map is mapped to the dynamically mapped storage region 224, some usage of the dynamically mapped region 224 may occur for storage. For example, the host device may exclusively request a write to an LBA that is in the LBA section 214, which results in a write to the dynamically provisioned storage region 224. In such a case, the data provided by the host is "pinned" to some area 230 in the dynamically mapped region 224. As a result, the amount of the storage space in the dynamically mapped region 224 that is available for performance-enhancing functions is reduced by the size of the data in area 230, which is "pinned" in the media cache. Pinning means that the data is permanently resident in the Media Cache. As more and more data is pinned in the dynamically mapped region 224, the capability of the storage device in providing performance-enhancing functions using the dynamically mapped storage region 224 decreases, resulting in some possible performance degradation.

In one implementation, when the data is pinned to any location within the dynamically mapped region 224, the controller manages the terminal resting place of that data in the dynamically mapped region 224. For example, the data that is written to the area 230 may be moved to some alternative location within the dynamically mapped region 224. Such dynamic mapping of the data pinned to the dynamically mapped region 224 allows more efficient use of the dynamically mapped region 224 for performance-enhancing functions. Note that if the controller is still managing pinned data, such pinned data may still have to be moved around from the terminal resting place.

Figure 3:
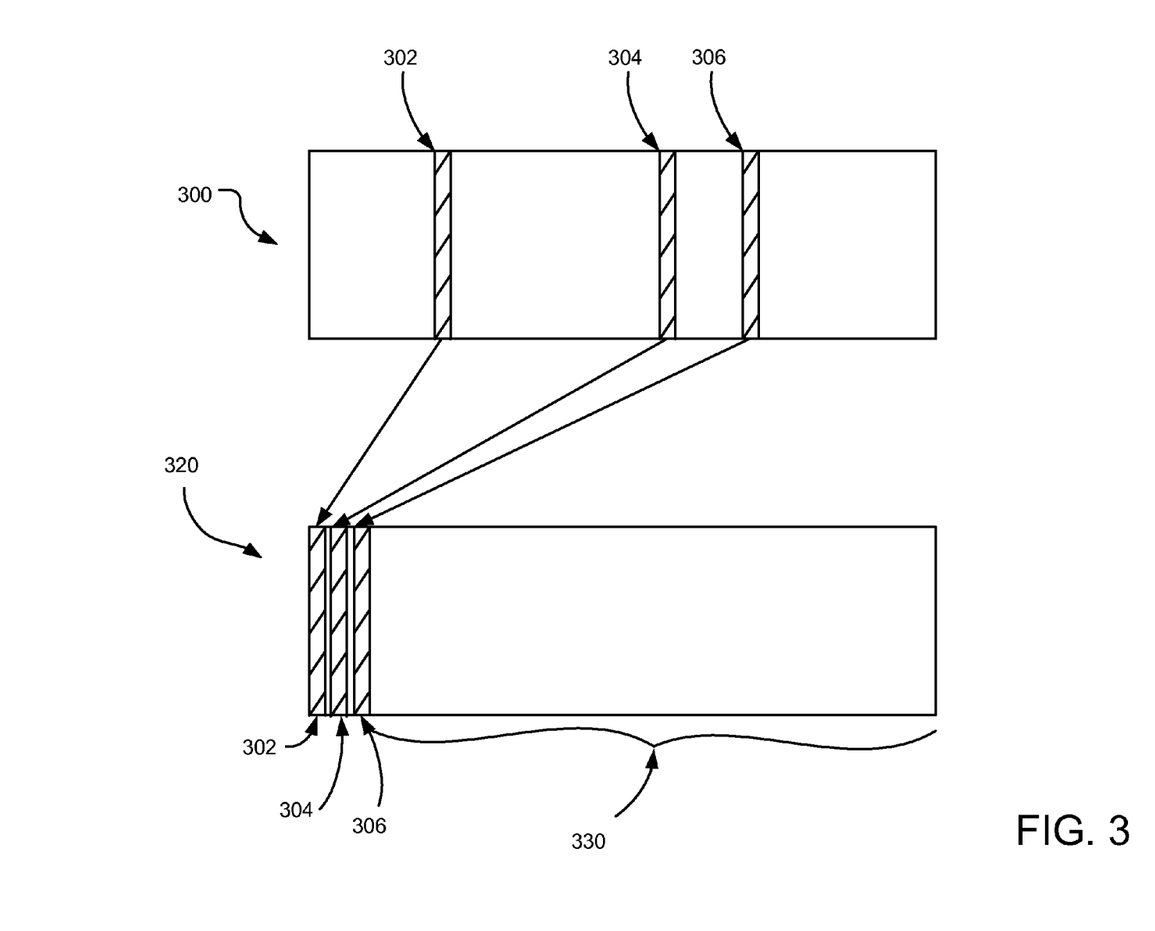
FIG. 3 illustrates a block diagram of an alternate implementation of a system for dynamic overprovisioning of media.

FIG. 3 illustrates an example of an expanded view of a dynamically mapped region 300 that can be used for performance-enhancing functions. Specifically, the dynamically mapped region 300 may have received host writes to a number of different locations 302, 304, 306, etc. As illustrated, such host writes are located at disparate location within the dynamically mapped region 300. As a result, the use of the dynamically mapped region 300 for performance boosting functions such as sorting data, pre-processing data, etc., is adversely affected. In one implementation, the data from the host write requests to the locations 302, 304, 306, are dynamically mapped to locations 302*a*, 302*b*, 302*c*, as illustrated by the dynamically mapped region 320. As a result of such dynamic mapping, a large section 330 of the dynamically mapped region 320 is still available for the performance-enhancing functions. As a result, the section 330, together with the storage region that is overprovisioned and designated as media cache, can be used for various performance and reliability-enhancing functions. Information about the mapping of the dynamic mapping region 320 may be stored in the overprovisioned storage region designated as media cache, as well as at various other locations on the storage device.

The performance/reliability-enhancing capability of the dynamic mapping may be determined based on the ratio of the mapped portion of the dynamically mapped region 300 to the unmapped region of the dynamically mapped region 300. The higher the amount of the dynamically mapped region 300 that gets mapped due to the targeted writings by the host to the dynamically mapped region 300, the higher the mapped to unmapped ratio and lower the performance-enhancing capability of the dynamically mapped region 300. On the other hand a lower mapped to unmapped ratio suggests that most of the dynamically mapped region 300 is available for performance-enhancing operations. It is possible for any data to be both mapped and unmapped.

When the dynamically mapped region 300 is mapped to LBA space that is infrequently used or unused, the ratio of the mapped to the unmapped regions of the dynamically mapped region 300 can be maintained low enough that the performance-enhancing functions provided by the dynamically mapped region 300 is substantially constant. At the same time, by providing the dynamically mapped region 300, the storage device provider is able to reduce the size of the storage region that is overprovisioning as the media cache, thus providing a lower cost to produce a higher capacity. Furthermore, by providing the dynamically mapped region 300, the storage provider is able to substantially decouple the relationship between the media cache size and the overprovisioning required for the satisfactory media performance and reliability.

Figure 4:
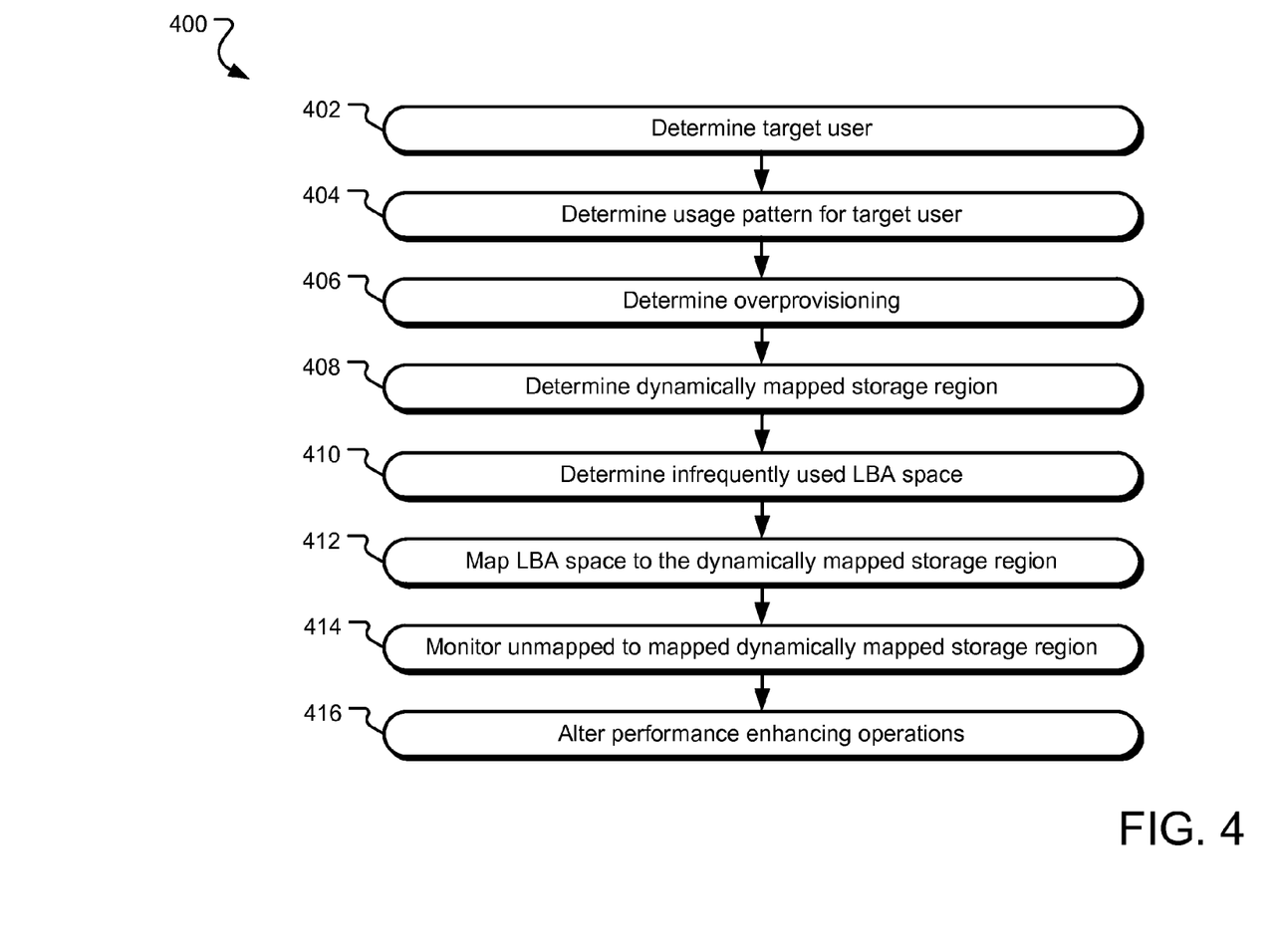
FIG. 4 illustrates example of operations for providing dynamic overprovisioning of media in a data storage system.

FIG. 4 illustrates an example flowchart 400 of a method of determining the size of the dynamically allocated storage region to be used for performance-enhancing functions. An operation 402 determines the target use for the storage device. For example, the target use of the storage device may be in a personal computer of a consumer, as a Fibre Channel network storage device, etc. Depending on the target user type, the storage device may be used in different manner. An operation 404 determines the usage pattern of the target user. For example, an end user that is a consumer using the storage device for personal use is not likely to use substantially all of the provided storage space. On the other hand, a corporate end user using the storage device as a data server may access most of the storage space very frequently. Furthermore, the operation 404 also determines the performance-enhancement requirements for the end user.

An operation 406 determines the amount of overprovisioning that will be provided for the storage device based on the usage patterns, performance-enhancement requirements, etc., of the target user. For example, for a target user with requirement for faster performance, the operation 406 may determine to provide more overprovisioning than for other users, etc. Subsequently, an operation 408 determines what portion of the storage space is to be configured as the dynamically mapped storage region. The operation 408 may make such determination based on the usage patterns of the target user, etc.

An operation 410 determines the infrequently used sections of the LBA space. For example, such infrequently used space may be based on historical usage pattern data. Alternatively, the infrequently or unused space may be determined dynamically at runtime after the storage device has been in the field and exposed to user access patterns. Yet alternatively, the "infrequently used" region may vary for each user/host. An operation 412 maps the infrequently used sections of the LBA space to the dynamically mapped storage regions. As these sections of the LBA space are infrequently used, it is less likely that the dynamically mapped region of the storage space will have frequent access requests. This allows more efficient use of the dynamically allocated storage region for performance-enhancing functions. An operation 414 monitors the usage of the dynamically mapped storage region. Specifically, the operation 414 may monitor the ratio of the mapped portion to the unmapped portion of the dynamically mapped storage region. In one implementation, an operation 416 alters one or more performance-enhancing operations based on the ratio of the size of the unmapped portion of the dynamically mapped storage region to the size of the mapped portion of the dynamically mapped storage region. For example, based on the ratio, the operation 416 may begin to unmap data mapped to the lightly used regions and swap it with data mapped to the heavily used regions, such that the data from the heavily used regions is mapped to media cache and the data from the lightly used region is mapped to its terminal resting place. For example, if the ratio is determined to be above a threshold, the dynamically mapped storage region is no longer used for any performance-enhancement functions.

Figure 5:
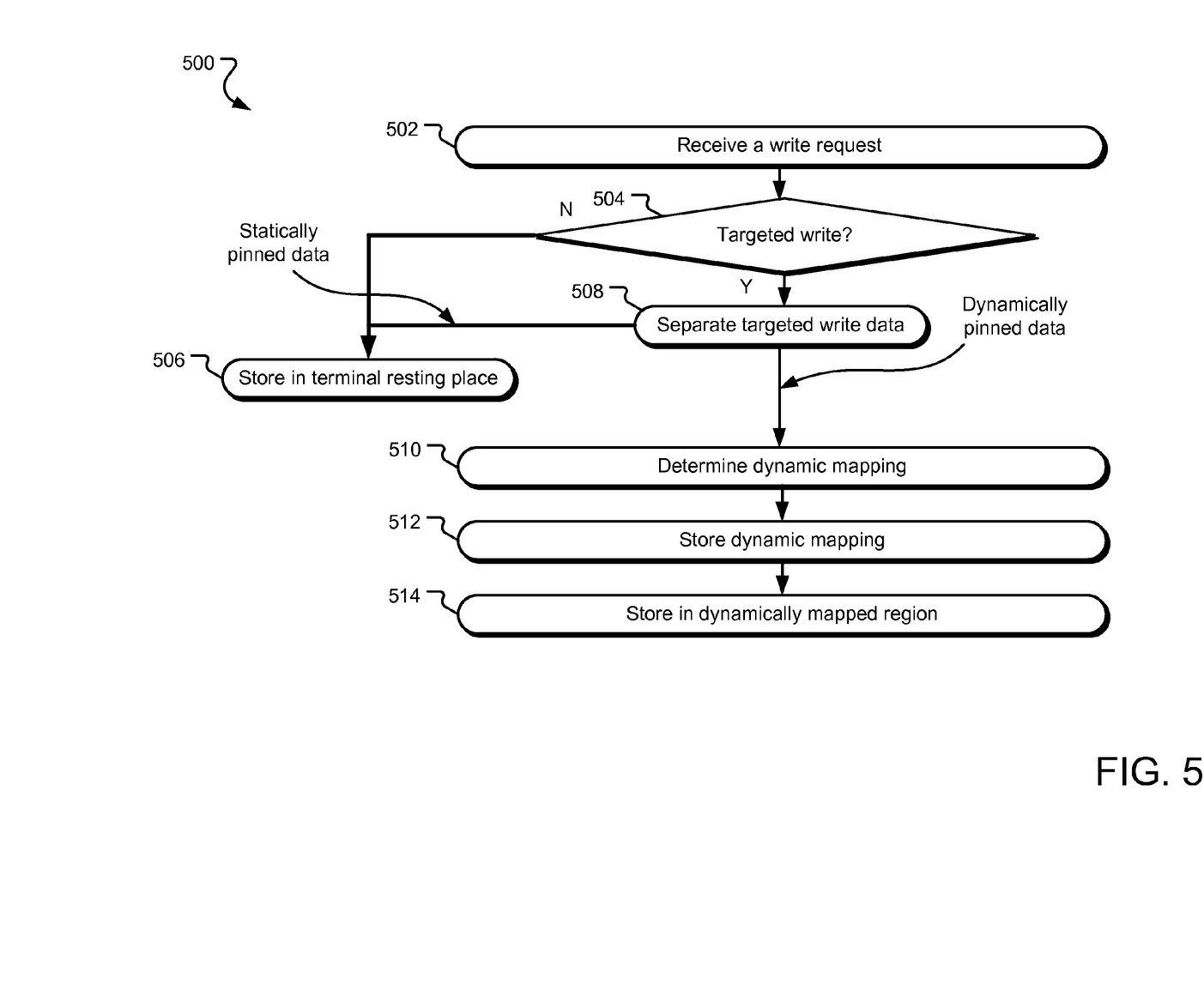
FIG. 5 illustrates another example of operations for providing dynamic overprovisioning of media in a data storage system.

FIG. 5 illustrates an example flowchart 500 of operations for providing dynamic overprovisioning of media in a data storage system. Specifically, an operation 502 receives a write request to the storage media. An operation 504 evaluates the write request to determine if the request is for a targeted write to a dynamically mapped storage region of the storage media that is also used for performance-enhancing operations. If the write request does not include any such targeted writes to the dynamically mapped storage region of the storage media than the write request is served and, after the initial pre-processing as necessary, an operation 506 stores the data in its terminal resting place in a statically mapped region of the storage media.

However, if the operation 504 determines that at least part of the write request includes a target write to a dynamically mapped storage region of the storage media, an operation 508 separates the data that is to be written to the a dynamically mapped storage region of the storage media from the other data. Subsequently, the statically pinned data is stored in its terminal resting place in the statically mapped storage regions. An operation 510 evaluates the dynamically pinned data, which is the data that is to be stored in the dynamically pinned storage region, to determine the dynamic mapping of such data. The operation 510 may determine to map such dynamically pinned data to a beginning section of the dynamically mapped storage region, to an end section of the dynamically mapped storage region, etc. In one implementation, an operation 512 stores the information about dynamic mapping. Subsequently, a storing operation 514 stores the data in the dynamically mapped storage region as per the dynamic mapping determined in operation 510.

Figure 6:
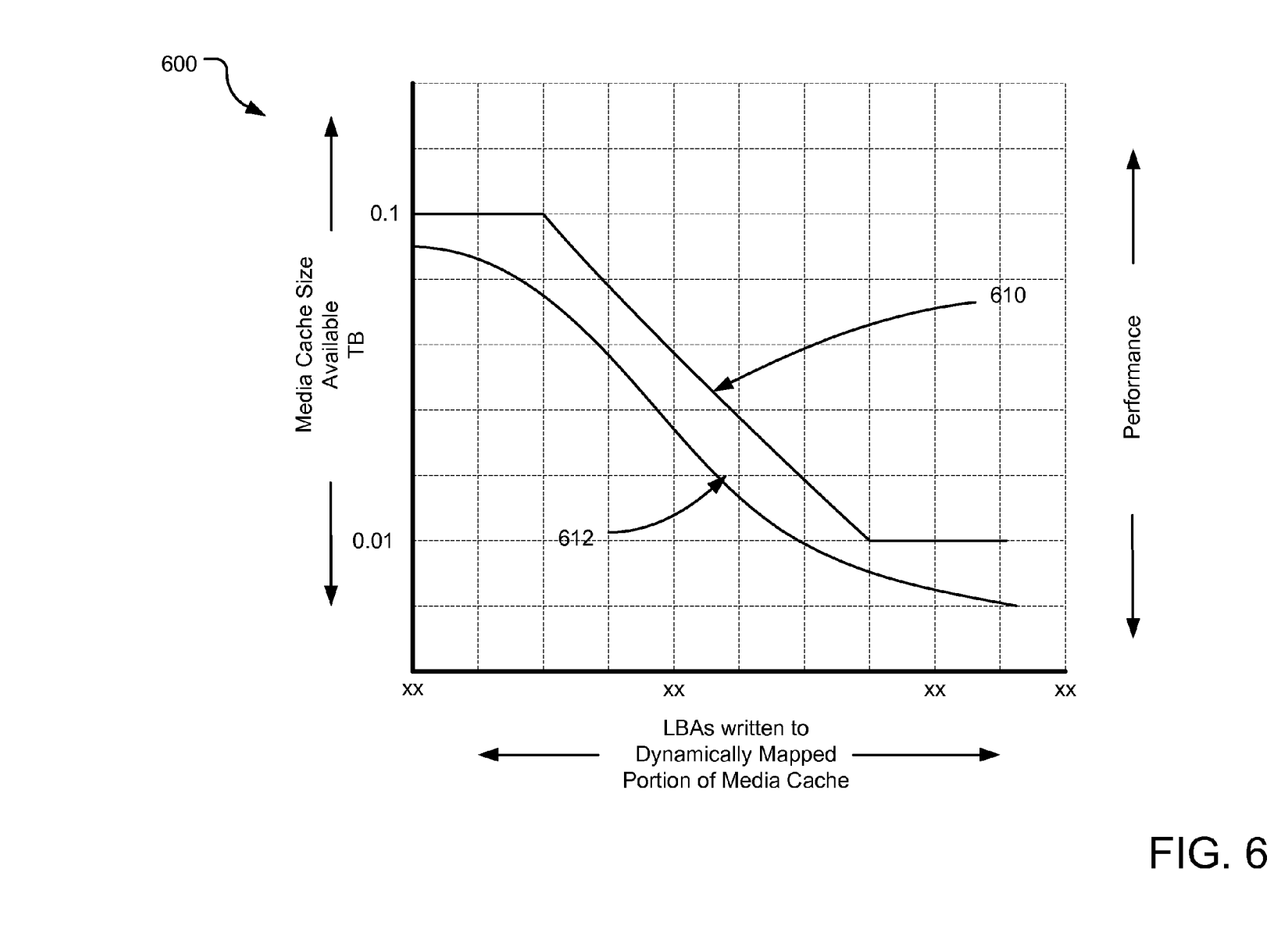
FIG. 6 illustrates an example graph showing effect of targeted writes to dynamically mapped storage region used for performance-enhancing functions.

FIG. 6 illustrates a graph 600 illustrating a possible relationship between the size of the total media cache that is available for performance-enhancing functions and the LBAs written to the dynamically mapped portion of the media cache. In this implementation, it is assumed that 0.01 TB of media cache is overprovisioned and that the dynamically mapped region, once filled, cannot necessarily be emptied. Another 0.09 TB of storage space is dynamically mapped and is used for performance-enhancing functions when available. As illustrated by the line 610, when there are no LBAs written to the dynamically mapped portion of the media cache, substantially all of the 0.1 TB (0.01 TB+0.09 TB) of media cache is available for performance-enhancing functions. As more and more of the dynamically mapped portion of the media cache is written to, less and less of the total media cache is available for performance-enhancement. Graph 600 also shows the level of performance of the drive by a line 612. As illustrated, as more and more of the dynamically mapped portion of the media cache is written to, the performance of the storage device is adversely affected.

The implementations described herein may be implemented as logical steps in one or more computer systems. The logical operations of the various implementations described herein are implemented (1) as a sequence of processor-implemented steps executing in one or more computer systems and (2) as interconnected machine or circuit modules within one or more computer systems. The implementation is a matter of choice, dependent on the performance requirements of the computer system. Accordingly, the logical operations making up the implementations of the implementations described herein are referred to variously as operations, steps, objects, or modules. Furthermore, it should be understood that logical operations may be performed in any order, unless explicitly claimed otherwise or a specific order is inherently necessitated by the claim language.

In the interest of clarity, not all of the routine functions of the implementations described herein are shown and described. It will be appreciated that in the development of any such actual implementation, numerous implementation-specific decisions are made in order to achieve the developer's specific goals, such as compliance with application- and business-related constraints, and that those specific goals will vary from one implementation to another and from one developer to another.

The above specification, examples, and data provide a complete description of the structure and use of example implementations. Because many alternate implementations can be made without departing from the spirit and scope of the invention, the invention resides in the claims hereinafter appended. Furthermore, structural features of the different implementations may be combined in yet another implementation without departing from the recited claims.

What is claimed is:
1. A storage device comprising:
a non-volatile storage medium on a storage disc; and
a processor configured to:
   allocate storage space of the non-volatile storage medium into (i) a permanently allocated media cache storage region; (ii) a dynamically mapped media cache storage region; and (iii) statically mapped storage region,
   determine usage patterns of different sections of a logical block address (LBA) map, and
   map a first section of the LBA map to the dynamically mapped media cache storage region, wherein the first section of the LBA map is used less frequently compared to the other sections of the LBA map.
2. The storage device of claim 1, wherein the processor is further configured to report usable storage capacity to a host to be equal to sum of the size of the dynamically mapped media cache storage region and the size of the statically mapped storage region.

3. The storage device of claim 1, wherein the processor is further configured to use each of the permanently allocated media cache storage region and the dynamically mapped media cache storage region for performance enhancing functions, including at least one of temporary copying of data, error checking, and sorting of data.

4. The storage device of claim 1, wherein the processor is further configured to:
separate write request data pinned to the dynamically mapped media cache storage region from write request data pinned to statically mapped storage regions; and
dynamically map the write request data pinned to the dynamically mapped media cache storage region to the dynamically mapped media cache storage region.

5. The storage device of claim 1, wherein the processor is further configured to dynamically change ratio of size of a mapped section of the dynamically allocated media cache storage region to size of an unmapped section of the dynamically allocated media cache storage region.

6. The storage device of claim 5, wherein the processor is further configured to change a performance-enhancing function based on the ratio of size of a mapped section of the dynamically allocated media cache storage region to size of an unmapped section of the dynamically allocated media cache storage region.

7. A method comprising:
allocating storage space of a non-volatile storage medium on a storage disc into (i) a permanently allocated media cache storage region; (ii) a dynamically mapped media cache storage region; and (iii) statically mapped storage region, wherein the dynamically mapped media cache storage region is used for performance-enhancing functions;
determining usage patterns of different sections of a logical block address (LBA) map; and
mapping a first section of the LBA map to the dynamically mapped media cache storage region, wherein the first section of the LBA map is used less frequently compared to the other sections of the LBA map.

8. The method of claim 7, wherein the non-volatile storage medium is at least one of (1) disc drive storage medium, and (2) a hybrid disc drive storage medium.

9. The method of claim 7, further comprising unmapping an initial section of logical block addresses (LBAs) from the dynamically mapped media cache storage region and mapping one or more different sections of the LBAs to the dynamically mapped media cache storage region.

10. The method of claim 9, wherein the unmapping the initial section of LBAs from the dynamically mapped media cache storage region and the mapping of the different sections of the LBAs to the dynamically mapped media cache storage region, is done in response to receiving a trim command from a host releasing a subset of the initial section of LBAs.

11. The method of claim 7, further comprising:
receiving a write request;
separating write request data pinned to the dynamically mapped media cache storage region from write request data pinned to statically mapped storage regions; and
dynamically mapping the write request data pinned to the dynamically mapped media cache storage region to the dynamically mapped media cache storage region.

12. The method of claim 11, further comprising statically mapping write request data pinned to statically mapped storage regions to the statically mapped storage regions.

13. The method of claim 11, further comprising altering a performance-enhancing function based on a ratio of size of a mapped section of the dynamically mapped media cache storage region to size of an unmapped section of the dynamically mapped media cache storage region.

14. The method of claim 13, further comprising:
comparing the ratio of size of a mapped section of the dynamically mapped media cache storage region to size of an unmapped section of the dynamically mapped media cache storage region; and
terminating using the dynamically mapped media cache storage region for performance-enhancing functions, if the ratio is above a threshold.

15. A storage system comprising:
a non-volatile storage medium; and
a processor configured to:
determine the expected usage pattern of the non-volatile storage medium and determine the size of over-provisioning for the non-volatile storage medium based on the expected usage pattern,
determine usage patterns of different sections of a logical block address (LBA) map, and
map a first section of the LBA map to the dynamically mapped media cache storage region, wherein the first section of the LBA map is used less frequently compared to the other sections of the LBA map.

16. The storage device of claim 15, wherein the processor is further configured to allocate the storage space of the storage medium, based on the expected usage pattern, into (i) a permanently allocated media cache storage region; (ii) a dynamically mapped media cache storage region; and (iii) statically mapped storage region.

17. The storage device of claim 16, wherein the processor is further configured to report usable storage capacity equal to the sum of the size of the dynamically mapped media cache storage region and the size of the statically mapped storage region.

18. The storage device of claim 16, wherein the processor is further configured to use each of the permanently allocated media cache storage region and the dynamically mapped media cache storage region for performance enhancing functions.

* * * * *